United States Patent
Ramirez Llanos et al.

(10) Patent No.: US 11,198,340 B2
(45) Date of Patent: Dec. 14, 2021

(54) COUPLER AND TOW-BAR DETECTION FOR AUTOMATED TRAILER HITCHING VIA CLOUD POINTS

(71) Applicant: Continental Automotive Systems, Inc., Auburn Hills, MI (US)

(72) Inventors: Eduardo Jose Ramirez Llanos, Auburn Hills, MI (US); Julien Ip, Madison Heights, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 106 days.

(21) Appl. No.: 16/399,244

(22) Filed: Apr. 30, 2019

(65) Prior Publication Data

US 2019/0337343 A1 Nov. 7, 2019

Related U.S. Application Data

(60) Provisional application No. 62/665,269, filed on May 1, 2018.

(51) Int. Cl.
| | |
|---|---|
| *G06T 7/70* | (2017.01) |
| *B60D 1/36* | (2006.01) |
| *B62D 13/06* | (2006.01) |

(52) U.S. Cl.
CPC .............. *B60D 1/36* (2013.01); *B62D 13/06* (2013.01); *G06T 7/70* (2017.01); *G06T 2207/10028* (2013.01); *G06T 2207/30252* (2013.01)

(58) Field of Classification Search
CPC .. G01C 21/005; G01C 21/32; B62D 15/0295; B60R 1/00

See application file for complete search history.

(56) References Cited

U.S. PATENT DOCUMENTS

| | | | |
|---|---|---|---|
| 2015/0321666 | A1 | 11/2015 | Talty et al. |
| 2016/0052548 | A1 | 2/2016 | Singh et al. |

(Continued)

FOREIGN PATENT DOCUMENTS

| | | |
|---|---|---|
| DE | 102016210376 A1 | 12/2016 |
| EP | 3086196 A1 | 10/2016 |

(Continued)

OTHER PUBLICATIONS

International Search Report and Written Opionion of the International Searching Authority dated Jun. 27, 2019 for corresponding PCT Application No. PCT/US2019/030127.

(Continued)

*Primary Examiner* — Joshua L Schwartz (57) ABSTRACT

A method of detecting and localizing a coupler of a trailer hitch associated with a trailer positioned behind a tow vehicle is provided. The method includes determining a region of interest within images from a rear camera. The region of interest includes a representation of the trailer hitch. The method includes determining a three-dimensional (3D) point cloud representing objects inside the region of interest. The method includes determining a camera plane based on the images. The method includes projecting the cloud points onto the camera plane and determining a coupler location based on the projected cloud points onto the camera plane. The method includes determining a path based on the coupler location. The path ending when the tow vehicle is attached to the trailer. The method also includes sending instructions to a drive system causing the tow vehicle to autonomously drive in a rearward direction along the path.

20 Claims, 8 Drawing Sheets

(56) References Cited

U.S. PATENT DOCUMENTS

2016/0086333 A1 3/2016 Scholl et al.
2016/0110878 A1 4/2016 Chang et al.
2016/0375831 A1* 12/2016 Wang ................. B62D 15/0295
                                                          348/148
2017/0174022 A1 6/2017 Hu et al.
2018/0039278 A1 2/2018 Huger et al.
2018/0361929 A1* 12/2018 Zhang .................... H04N 7/181

FOREIGN PATENT DOCUMENTS

EP   3171334 A1   5/2017
EP   3285485 A1   2/2018
EP   3299191 A1   3/2018

OTHER PUBLICATIONS

Yousef Atoum et al., "Monocular Video-Based Trailer Coupler Detection Using Multiplexer Convolutional Neural Network," ICCV 2017, pp. 5477-5485.

* cited by examiner

COUPLER AND TOW-BAR DETECTION FOR AUTOMATED TRAILER HITCHING VIA CLOUD POINTS

CROSS REFERENCE TO RELATED APPLICATIONS

This U.S. patent application claims priority under 35 U.S.C. § 119(e) to U.S. Provisional Application 62/665,269, filed on May 1, 2018, which is hereby incorporated by reference in its entirety.

TECHNICAL FIELD

This disclosure relates to a method and device for detecting a coupler and a tow-bar of a trailer during automated trailer hitching via a three-dimensional point cloud map.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. A receiver hitch mounts on the tow vehicle and connects to the trailer hitch to form a connection. The trailer hitch may be a ball and socket, a fifth wheel and gooseneck, or a trailer jack. Other attachment mechanisms may also be used. In addition to the mechanical connection between the trailer and the powered vehicle, in some examples, the trailer is electrically connected to the tow vehicle. As such, the electrical connection allows the trailer to take the feed from the powered vehicle's rear light circuit, allowing the trailer to have taillights, turn signals, and brake lights that are in sync with the lights of the powered vehicle.

Recent advancements in sensor technology have led to improved safety systems for vehicles. As such, it is desirable to provide a system that is capable of identifying a coupler and a tow-bar of a trailer positioned behind a tow vehicle in real-time and is capable of real-time coupler and tow-bar localization which allows the tow vehicle to autonomously maneuver towards the trailer for automated hitching.

SUMMARY

One aspect of the disclosure provides a method of detecting and localizing a coupler of a trailer hitch associated with a trailer positioned behind a tow vehicle. The method includes receiving, at data processing hardware, images from a rear camera positioned on a back portion of a vehicle and in communication with the data processing hardware. The method also includes determining, by the data processing hardware, a region of interest within the images. The region of interest includes a representation of the trailer hitch. The method also includes determining, by the data processing hardware, a three-dimensional (3D) point cloud representing objects inside the region of interest. The method also includes determining, by the data processing hardware, a camera plane where the rear camera moves based on the received images. The method also includes projecting, by the data processing hardware, the cloud points onto the camera plane. The method includes determining, by the data processing hardware, a coupler location based on the projected cloud points onto the camera plane. The method also includes determining, by the data processing hardware, a path based on the coupler location. The path ending when the tow vehicle is attached to the trailer. The method also includes sending, from the data processing hardware to a drive system, instructions causing the tow vehicle to autonomously drive in a rearward direction along the path.

Implementations of the disclosure may include one or more of the following optional features. In some implementations, the method further includes determining, by the data processing hardware, an alignment direction of the trailer with respect to the vehicle based on the projected cloud points onto the camera plane. The path may also be based on the alignment direction.

In some examples, the method includes determining, by the data processing hardware, a longitudinal distance between the rear camera and the coupler. The method may include: determining a plane normal to the alignment direction; and determining a first distance between the rear camera and the plane. The first distance indicative of the longitudinal distance. The method may also include: projecting a position of the rear camera on the plane; and determining a second distance between the projection of the position of the rear camera on the plane and the projection of the coupler in the camera plane. The second distance indicative of the longitudinal distance. The path may be also based on the longitudinal distance and/or the lateral distance.

In some implementations, determining the region of interest within the images includes: sending, from the data processing hardware to a display, instructions to display the received images; and receiving, at the data processing hardware, a user selection of the region of interest.

Determining the point cloud of the region of interest may include executing one of a visual odometry (VO) algorithm, a simultaneous localization and mapping (SLAM) algorithm, and a structure from motion (SfM) algorithm. In some examples, the method includes initializing the data processing hardware before executing the algorithms by: sending, from the data processing hardware to the drive system, instructions causing the tow vehicle to drive in a forward or a rearward straight direction for a predefined distance.

In some implementations, determining the camera plane includes: determining, by the data processing hardware, at least three three-dimensional positions of the rear camera from the received images. In addition, determining the camera plane may also include determining, by the data processing hardware, the camera plane based on the three three-dimensional positions.

In some examples, the method further includes determining, by the data processing hardware, a road plane by: determining a height of the rear camera from a road supporting the tow vehicle; and shifting the camera plane by the height of the rear camera.

In some examples, the method includes determining a road plane by: extracting, by the data processing hardware, at least three feature points from the images including a road; and associating, by the data processing hardware, a point of the point cloud with each of the feature points. The method for determining the road plane may also include determining, by the data processing hardware, the road plane based on the at least three points of the point cloud associated with the at least three feature points. In some examples, determining the camera plane includes: determining, by the data processing hardware, a height of the rear camera from the road; and shifting, by the data processing hardware, the road plane by the height of the rear camera.

In some implementations, the method further includes determining, by the data processing hardware, a height of the coupler based on a distance between the coupler and the road plane. The path may be also based on the height of the coupler.

Another aspect of the disclosure provides a system for detecting and localizing a coupler of a trailer hitch associated with a trailer positioned behind a tow vehicle. The system includes: data processing hardware; and memory hardware in communication with the data processing hardware. The memory hardware stores instructions that when executed on the data processing hardware cause the data processing hardware to perform operations that include the method described above.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
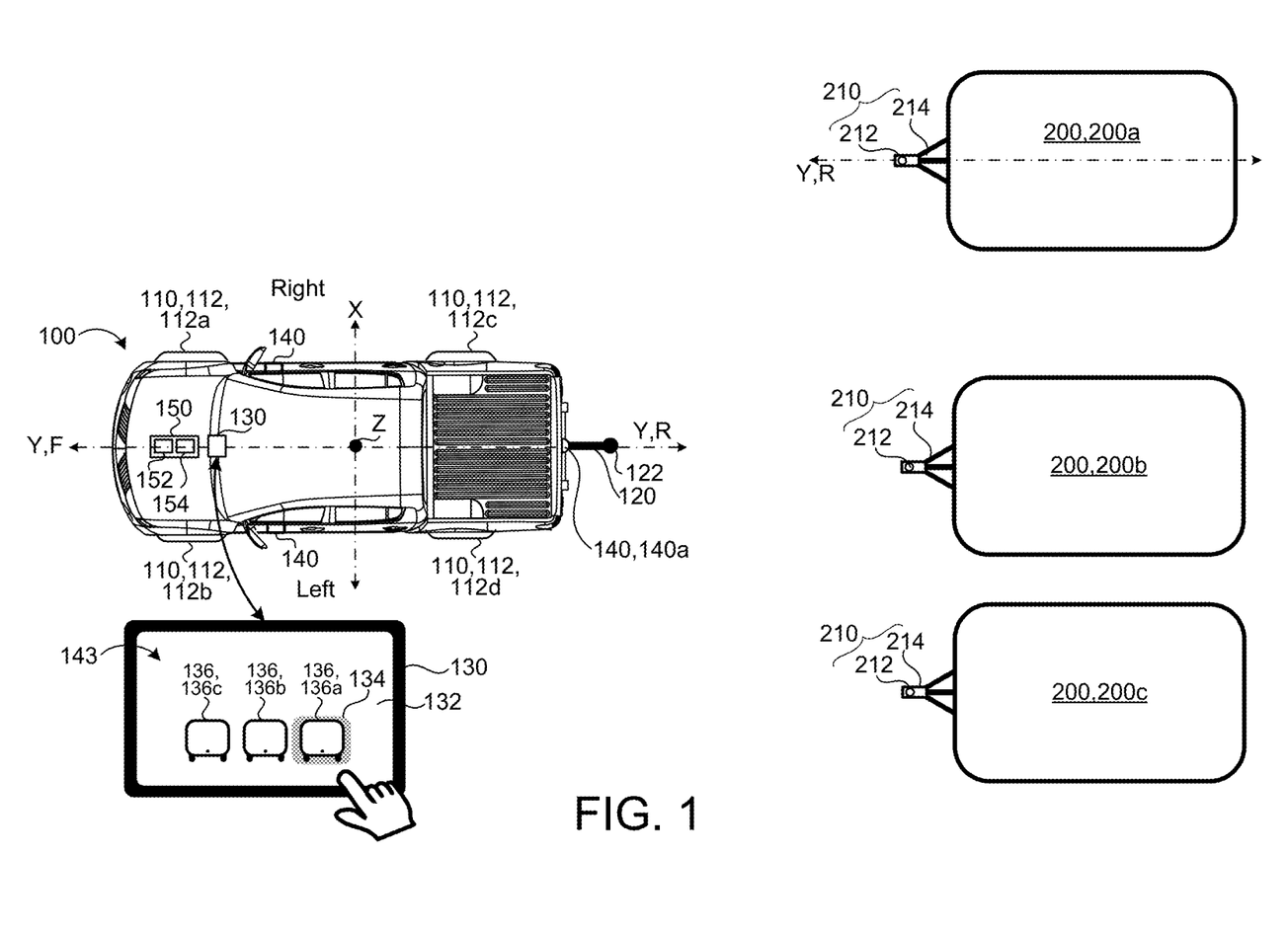
FIG. 1 is a schematic top view of an exemplary tow vehicle positioned in front of trailers.
Figure 2:
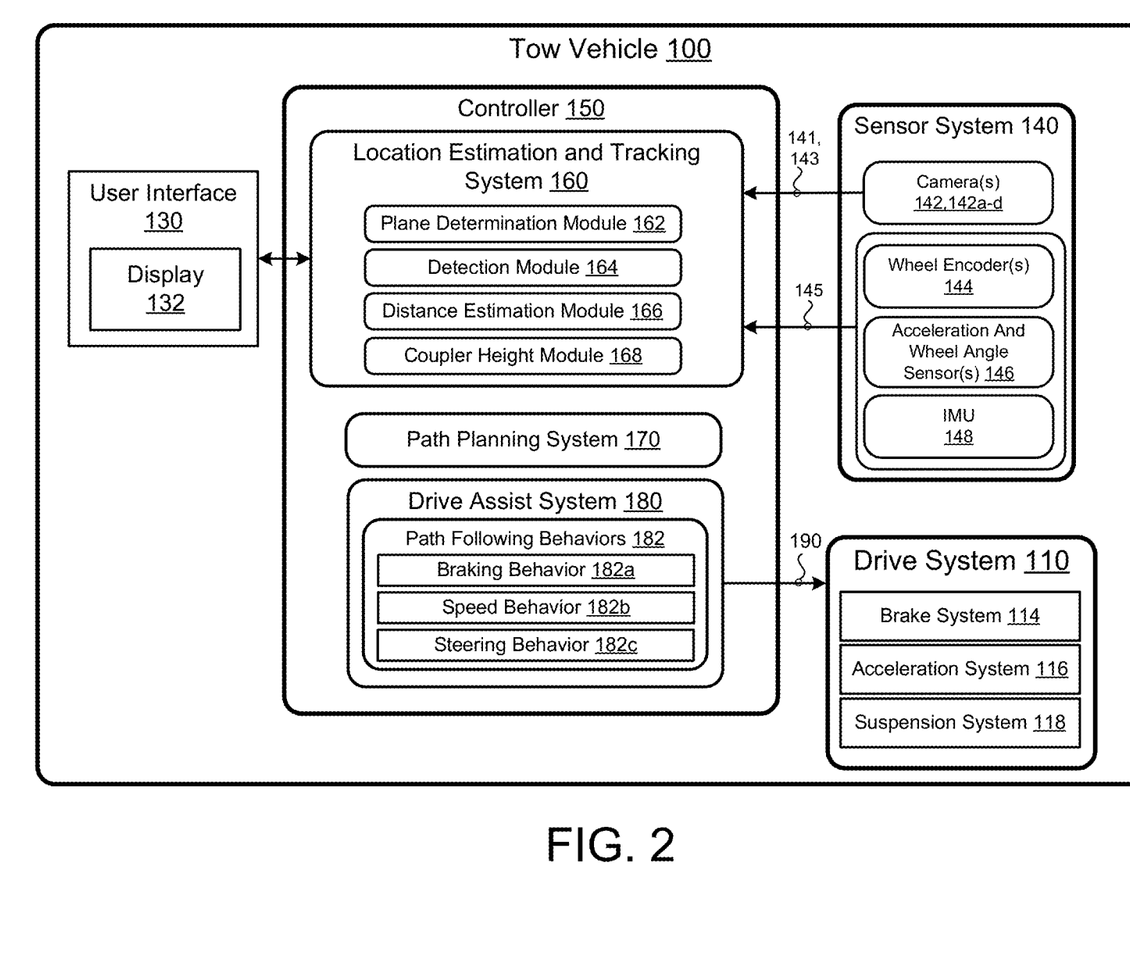
FIG. 2 is a schematic view of an exemplary tow vehicle having a user interface, a sensor system, and controller.
Figure 3:
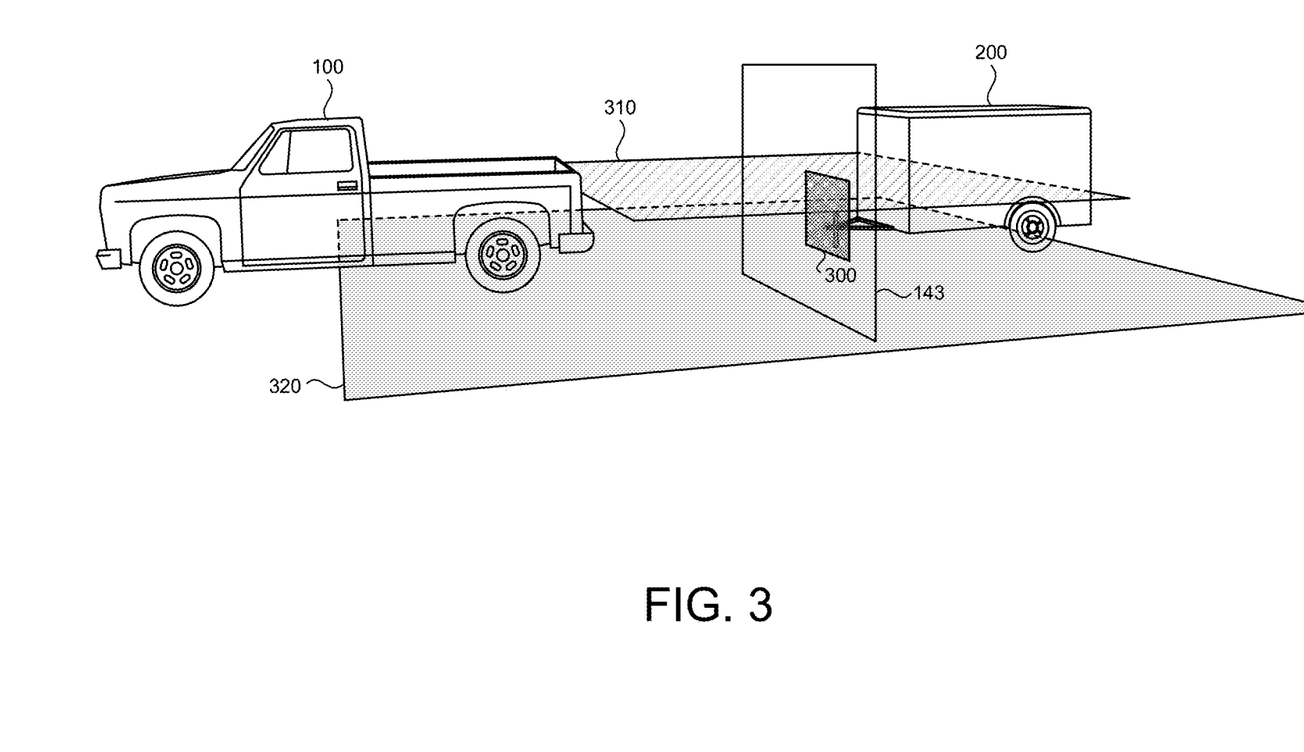
FIG. 3 is a perspective view of a tow vehicle and the trailer.

Referring to FIGS. 1 and 2, a tow vehicle 100, such as, but not limited to a car, a crossover, a truck, a van, a sports-utility-vehicle (SUV), and a recreational vehicle (RV) may be configured to hitch to and tow a trailer 200. The tow vehicle 100 connects to the trailer 200 by way of a tow vehicle hitch 120 having a tow vehicle hitch ball 122 connecting to a trailer hitch 210 having a trailer coupler 212. It is desirable to have a tow vehicle 100 that is capable of autonomously backing up towards a trailer 200 identified from one or more representations 136, 136 a-c of trailers 200, 200a-c displayed on a user interface 130, such as a user display 132. In addition, it is also desirable to have a location estimation and tracking system 160 supported by the tow vehicle 100 that is capable of executing an algorithm that tracks and estimates the position of the trailer hitch 210, i.e., the coupler 212 and a tow-bar 214 of the trailer 200 in real time. The location estimation and tracking system 160 may use a single camera 142a positioned on the rear portion of the tow vehicle 100 to capture images 143 and analyze the images 143 to identify and track the coupler 212 and the tow-bar 214 of the trailer 200. The location estimation and tracking system 160 generates a semi-dense/dense point cloud 400 (shown in FIGS. 4 and 5) in a predefined region of interest (ROI) 300 within each captured image 143 and based on the point cloud 400 the location estimation and tracking system 160 localizes the coupler 212 and the tow-bar 214 within the point cloud 400. The localization of the coupler 212 and the tow-bar 214 in the point cloud 400 may be generated by well-known frameworks, such as, but not limited to, Visual Odometry (VO), Simultaneous Localization and Mapping (SLAM), and Structure from Motion (SfM). Additionally, the location estimation and tracking system 160 determines a camera pose of the rear camera 142a within the generated point cloud 400. Based on the determined camera pose, the location estimation and tracking system 160 determines a camera plane 310 (FIG. 3) in which the camera 142a moves while the tow vehicle 100 is autonomously moving towards the trailer 200. The location estimation and tracking system 160 may then use the camera plane 310 to reduce the complexity of a search space within the received images 143 for the coupler 212 and the tow-bar 214. When the location estimation and tracking system 160 identifies the coupler 212 within the image 143 and the coupler position, the location estimation and tracking system 160 uses a shape of the tow-bar 214 to find the direction of alignment 220 of the trailer 200.

Referring to FIGS. 1-6, in some implementations, a driver of a tow vehicle 100 wants to tow a trailer 200 positioned behind the tow vehicle 100. The tow vehicle 100 may be configured to receive an indication of a driver selection 134 associated with a representation of a selected trailer 200, 200a-c. In some examples, the driver maneuvers the tow vehicle 100 towards the selected trailer 200, 200a-c, while in other examples, the tow vehicle 100 autonomously drives towards the selected trailer 200, 200a-c. The tow vehicle 100 may include a drive system 110 that maneuvers the tow vehicle 100 across a road surface based on drive commands having x, y, and z components, for example. As shown, the drive system 110 includes a front right wheel 112, 112a, a front left wheel 112, 112b, a rear right wheel 112, 112c, and a rear left wheel 112, 112d. The drive system 110 may include other wheel configurations as well. The drive system 110 may also include a brake system 114 that includes brakes associated with each wheel 112, 112a-d, and an acceleration system 116 that is configured to adjust a speed and direction of the tow vehicle 100. In addition, the drive system 110 may include a suspension system 118 that includes tires associates with each wheel 112, 112a-d, tire air, springs, shock absorbers, and linkages that connect the tow vehicle 100 to its wheels 112, 112a-d and allows relative motion between the tow vehicle 100 and the wheels 112, 112a-d. The suspension system 118 may be configured to adjust a height of the tow vehicle 100 allowing a tow vehicle hitch 120 (e.g., a tow vehicle hitch ball 122) to align with a trailer hitch 210 (e.g., trailer hitch coupler 212), which allows for autonomous connection between the tow vehicle 100 and the trailer 200.

The tow vehicle 100 may move across the road surface by various combinations of movements relative to three mutually perpendicular axes defined by the tow vehicle 100: a transverse axis X, a fore-aft axis Y, and a central vertical axis Z. The transverse axis X, extends between a right side and a left side of the tow vehicle 100. A forward drive direction along the fore-aft axis Y is designated as F, also referred to as a forward motion. In addition, an aft or rearward drive direction along the fore-aft direction Y is designated as R, also referred to as rearward motion. When the suspension system 118 adjusts the suspension of the tow vehicle 100, the tow vehicle 100 may tilt about the X axis and or Y axis, or move along the central vertical axis Z.

The tow vehicle 100 may include a user interface 130. The user interface 130 receives one or more user commands from the driver via one or more input mechanisms or a screen display 132 (for examples, a touch screen display) and/or displays one or more notifications to the driver. The user interface 130 is in communication with a vehicle controller 150, which is in turn in communication with a sensor system 140. In some examples, the user interface 130 displays an image of an environment of the tow vehicle 100 leading to one or more commands being received by the user interface 130 (from the driver) that initiate execution of one or more behaviors. In some examples, the user display 132 displays one or more representations 136, 136a-c of trailers 200, 200a-c positioned behind the tow vehicle 100. In this case, the driver selects a representation 136, 136a-c of a trailer 200, 200a-c causing the controller 150 to execute the location estimation and tracking system 160 associated with the trailer 200, 200a-c of the selected representation 136, 136a-c. In some examples, where the user display 132 displays one representation 136, 136a-c of a trailers 200, 200a-c positioned behind the tow vehicle 100, the controller 150 may execute the location estimation and tracking system 160 associated with the one trailer 200, 200a-c of the one representation 136, 136a-c automatically or upon an indication from the driver to autonomously attach to the trailer 200, 200a-c. The vehicle controller 150 includes a computing device (or processor or data processing hardware) 152 (e.g., central processing unit having one or more computing processors) in communication with non-transitory memory 154 (e.g., a hard disk, flash memory, random-access memory, memory hardware) capable of storing instructions executable on the computing processor(s) 152.

The tow vehicle 100 may include a sensor system 140 to provide reliable and robust driving. The sensor system 140 may include different types of sensors that may be used separately or with one another to create a perception of the environment of the tow vehicle 100 that is used for the tow vehicle 100 to drive and aid the driver in make intelligent decisions based on objects and obstacles detected by the sensor system 140. The sensor system 140 may include the one or more cameras 142. In some implementations, the tow vehicle 100 includes a rear camera 142a that is mounted to provide images 143 with a view of a rear-driving path for the tow vehicle 100. The rear camera 142a may include a fisheye lens that includes an ultra wide-angle lens that produces strong visual distortion intended to create a wide panoramic or hemispherical image 143. Fisheye cameras capture images 143 having an extremely wide angle of view. Moreover, images 143 captured by the fisheye camera have a characteristic convex non-rectilinear appearance. Other types of cameras may also be used to capture images 143 of the rear-driving path of the tow vehicle 100.

In some examples, the sensor system 140 also includes one or more wheel encoders 144 associated with one or more wheels 112, 112a-d of the tow vehicle 100. The wheel encoder 144 is an electro-mechanical device that converts an angular position or motion of the wheel to analog or digital output signals. Therefore, the wheel encoder 144 determines the speed and distance the wheel has traveled.

The sensor system 140 may also include one or more acceleration and wheel angle sensors 146 associated with the tow vehicle 100. The acceleration and wheel angle sensors 146 determine the acceleration of the tow vehicle 100 in the directions of the transverse axis X and fore-aft axis Y.

The sensor system 140 may also include the IMU (inertial measurement unit) 148 configured to measure the vehicle's linear acceleration (using one or more accelerometers) and rotational rate (using one or more gyroscopes). In some examples, the IMU 148 also determines a heading reference of the tow vehicle 100. Therefore, the IMU 148 determines the pitch, roll, and yaw of the tow vehicle 100.

The sensor system 140 may include other sensors such as, but not limited to, radar, sonar, LIDAR (Light Detection and Ranging, which can entail optical remote sensing that measures properties of scattered light to find range and/or other information of a distant target), LADAR (Laser Detection and Ranging), ultrasonic sensors, stereo cameras, etc. The wheel encoders 144, the acceleration and wheel angle sensors 146 and the IMU 148 output sensor data 145 to the controller 150, i.e., the location estimation and tracking system 160.

The vehicle controller 150 executes the location estimation and tracking system 160 that receives images 143 from the rear camera 142a and determines a location of the trailer 200 with respect to the tow vehicle 100 identified by the driver via the user interface 130. More specifically, the location estimation and tracking system 160 determines a position of the coupler 212 and a position of the tow-bar 214 within the received image 143. In addition, the location estimation and tracking system 160 determines a position of the coupler 212 and a position of the tow-bar 214 in a three-dimensional (3D) coordinate system or a global coordinate system. In some examples, the location estimation and tracking system 160 also determines a direction of alignment 220 for the tow vehicle 100 to be aligned with the trailer 200, such that the fore-aft axis Y of the tow vehicle 100 overlaps with a fort-aft axis Y of the trailer 200. The location estimation and tracking system 160 includes an iterative algorithm that automates the hitching and alignment process for a vehicle-trailer system (see FIG. 3).

The location estimation and tracking system 160 receives images 143 from the rear camera 142a. In some implementations, the location estimation and tracking system 160 instructs the user interface 130 to display the received images 143 on the display 132 and solicit from the user a selection of a region of interest (ROI) 300 within the displayed image 143. The ROI 300 is a bounding box that includes the trailer hitch 210. In other examples, the location estimation and tracking system 160 may include a tow-bar-coupler identification algorithm that identifies the trailer hitch 210 within the image 143 and bounds the trailer hitch 210 by a bounding box being the ROI 300.

Figure 4:
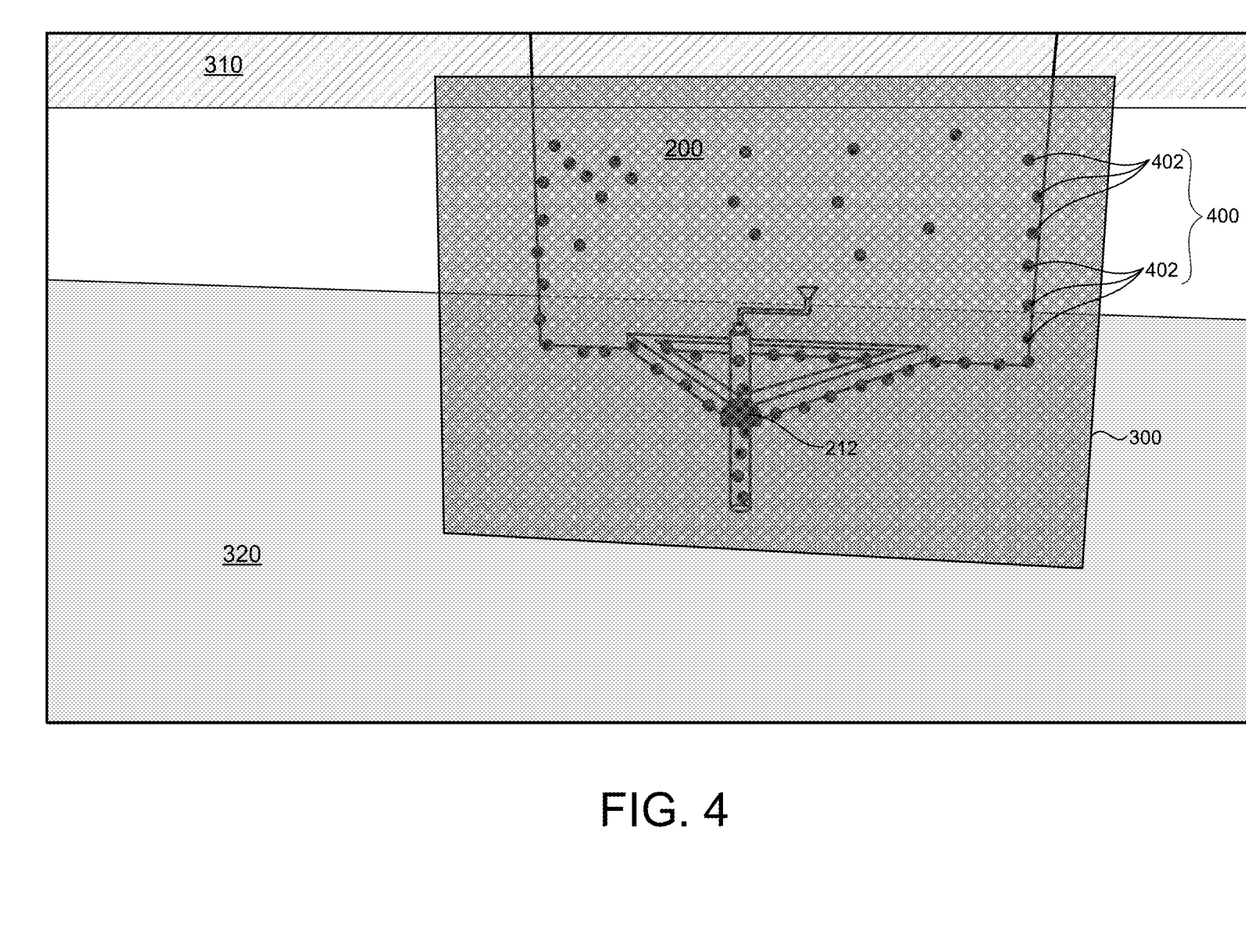
FIG. 4 is a perspective view of the semi-dense or dense point cloud for a region of interest ROI within a captured image.

The location estimation and tracking system 160 generates a semi-dense/dense point cloud 400 of the tow-bar 214 and coupler 212 and a portion of the trailer 200 that are within the ROI 300 as shown in FIG. 4. A point cloud is a set of data points in space, more specifically the point cloud includes a number of points on the external surface of objects.

The location estimation and tracking system 160 may use one or more techniques to localize the tow-bar 214 and the coupler 212 in the point cloud 400. Some of these techniques include, but are not limited to, Visual Odometry (VO), Simultaneous Localization and Mapping (SLAM), and Structure from Motion (SfM). VO is a method of determining a position and orientation of the trailer 200, camera 142a, the coupler 212, or the tow-bar 214 by analyzing the images 143 received from the camera 142a. The VO method may extract image feature points and tracks them in the image sequence. Examples of the feature points may include, but are not limited to, edges, corners or blobs on the trailer 200, the coupler 212, or the tow-bar 214. The VO method may also use pixel intensity in the image sequence directly as visual input. The SLAM method constructs or updates a map of an unknown environment while simultaneously keeping track of one or more targets. In other words, the SLAM method uses the received images 143 as the only source of external information, to establish the position and orientation of the tow vehicle 100 and the camera 142a, while at the same time, constructs a representation of the objects in the ROI 300. The SfM method estimates the 3D structure of the objects in the ROI 300 based on the received images 143 (i.e., 2D images). The SfM method may estimate the pose of the camera 142a and the tow vehicle 100 based on the sequence of images 143 that the camera 142 captures.

In some implementations, the location estimation and tracking system 160 executes the SLAM method or the SfM method, thus the location estimation and tracking system 160 is first initialized. Therefore, the location estimation and tracking system 160 sends the drive system 110 instructions or commands 190 causing the drive system 110 to move the tow vehicle 100 in a straight direction along the fore-aft axis Y, for example, in the forward drive direction F or rearward drive direction R for a predetermined distance. In some examples, the predetermined distance is a few centimeters. The predetermined distance may be between 5 cm to 50 cm. The forward F and rearward R drive movement along the fore-aft axis Y causes the SLAM or the SfM to initialize. Additionally, along the forward F and rearward R drive movement, the location estimation and tracking system 160 executes a tracker algorithm to update the ROI 300 within the image 143 that was provided by the driver or determined by the location estimation and tracking system 160. As the tow vehicle 100 moves in the rearward direction R, the perspective and the size of the trailer 200, tow-bar 214, and coupler 212 changes in the image 143. The ROI 300 includes the tow bar and the coupler, so that the feature points or pixel intensities in the ROI 300 are tracked by the location estimation and tracking system 160. The ROI 300 is used to filter out anything that is not the tow-bar 214 and the coupler 212 in the image 143.

The location estimation and tracking system 160 analyzes all sequences of images 143 received instead of two images. Therefore, the location estimation and tracking system 160 is more robust when making its determinations. The VO, SLAM and SfM frameworks, which are well established theories, allow the vehicle to localize in a real-time in a self-generated 3D point cloud map. The 3D point cloud map generated by VO, SLAM or SfM algorithms allows the plane determination module 162 to find the trailer coupler 212 in a 3D world (not in the image frame).

In some implementations, the location estimation and tracking system 160 determines a scale of the 3D point cloud map based on one of VO, SLAM, or SfM algorithms. When the 3D point cloud map is generated by using only a mono-camera, it suffers from scale ambiguity, i.e., the map made only with monocular cameras is recoverable only up to a scale. However, if the location estimation and tracking system 160 does not know the scale of the map, then the location estimation and tracking system 160 may determine the scale of the map by fusing the VO, SLAM, or SfM algorithms with the vehicle sensor data 145. In another examples, the location estimation and tracking system 160 determines the scale of the map based on the road plane 320. The location estimation and tracking system 160 determines the distance from the camera location to the road plane 320 in the map. The scale of the map is given by the height of the camera 142a (from the camera data 141) divided by the distance calculated in this step. A 3D point cloud map represents the environment's structure without providing details relating to the distance of the structures within the map. Therefore, the location estimation and tracking system 160 determines the scale of the map which includes the distance information, and this allows the location estimation and tracking system 160 to determine the location of the coupler 212 in the world coordinate.

The location estimation and tracking system 160 includes a plane determination module 162 that is configured to determine a camera plane 310 and a road plane 320. In some implementations, the plane determination module 162 determines a camera plane 310 along which the camera 142a moves and a road plane 320. To determine the camera plane 310, the plane determination module 162 uses at least three previous 3D positions of the camera 142a received from the camera 142a as camera data 141. The camera data 141 may include intrinsic parameters (e.g., focal length, image sensor format, and principal point) and extrinsic parameters (e.g., the coordinate system transformations from 3D world coordinates to 3D camera coordinates, in other words, the extrinsic parameters define the position of the camera center and the heading of the camera in world coordinates). In addition, the camera data 141 may include minimum/maximum/average height of the camera 142a with respect to ground (e.g., when the vehicle is loaded and unloaded), and a longitudinal distance between the camera 142a and the tow vehicle hitch ball 122. The plane determination module 162 determines the camera plane 310 based on the 3D positions of the three points of the at least three previous 3D positions of the camera 142a. In some examples, the location estimation and tracking system 160 determines the road plane 320 based on the camera plane 310. In some implementations, based on the camera plane 310 and the camera data 141, the plane determination module 162 determines the road plane 320 since the road plane 320 is a shift of the camera plane 310 by the height of the camera 142a from the ground (which is provided in the camera information 141). This procedure is helpful when the three 3D points used to determine the camera plane 310 are collinear, in which case there exists infinite number of camera planes 310 that are coplanar to the line given by the 3D points.

To determine the road plane 320, the plane determination module 162 extracts at least three feature points from the captured 2D image 143 associated with the road. Following, the location estimation and tracking system 160 determines the 3D position of the three feature points within the point cloud 400 and then the location estimation and tracking system 160 computes the road plane 320 based on the three feature points. In some examples, the location estimation and tracking system 160 determines the camera plane 310 based on the road plane 320. In some implementations, based on the road plane 320 and the camera information 141, the location estimation and tracking system 160 determines the camera plane since the camera plane 310 is a shift of the road plane 320 by the height of the camera 142a from the ground (which is provided by the camera information 141).

The plane determination module 162 may determine and update the planes 310, 320 in real time as the tow vehicle 100 is autonomously moving in the rearward R direction, or if the plane determination module 162 determines that the road is flat, then the location estimation and tracking system 160 may determine the planes 310, 320 only once. The above methods use three points to determine the camera plane 310 or the road plane 320. However, in some examples, the plane determination module 162 may rely on more than three points to determine a plane 310, 320. In this case, the location estimation and tracking system 160 uses Least squares method, Radom Sample Consensus (RANSAC) method, Support Vector Machine (SVM) method, or any variation of these algorithms to determine the plane 310, 320. By using more than three points to determine the plane 310, 320, the plane determination module 162 increases the robustness to outliers.

Figure 5:
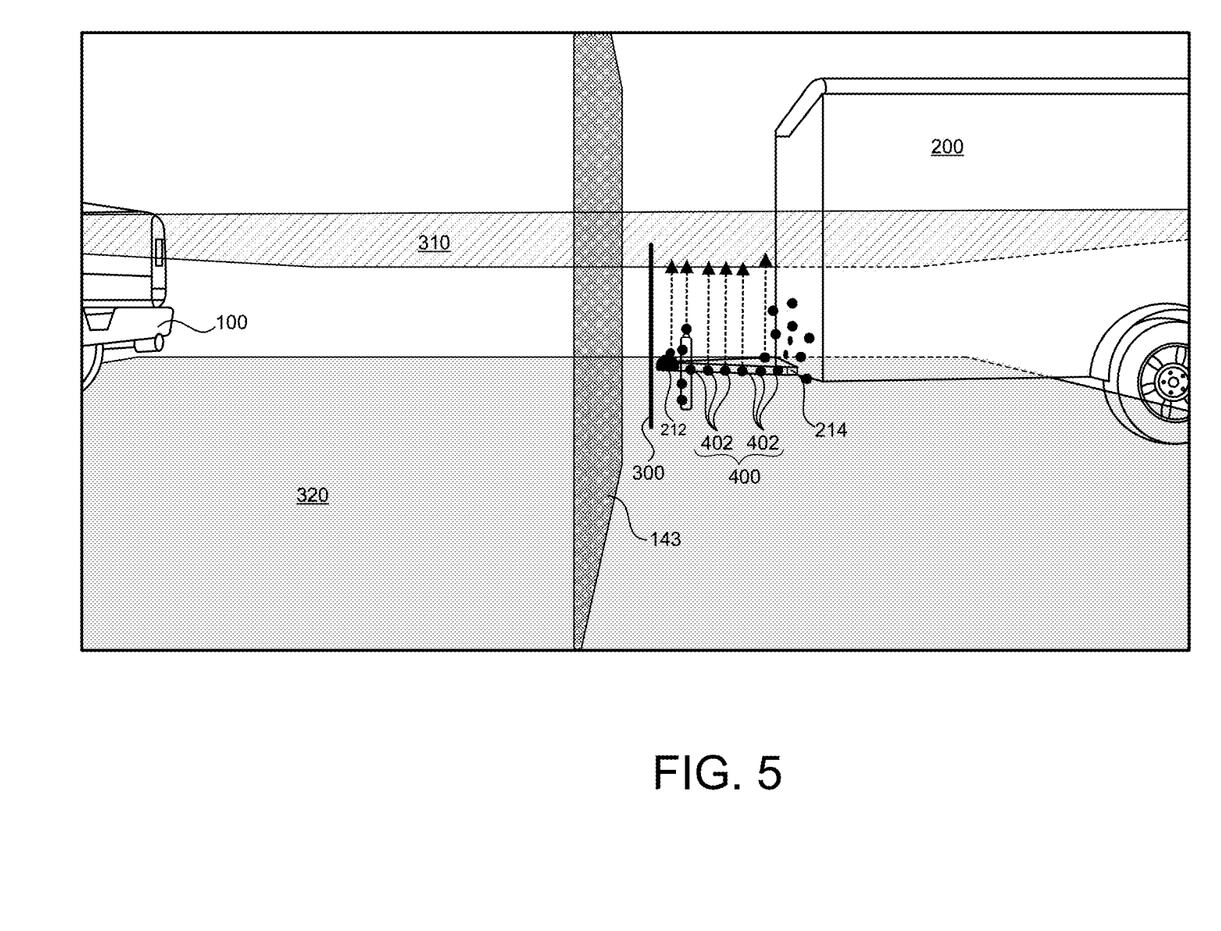
FIG. 5 is a perspective side view of the projection of the point cloud to a camera plane in which the camera moves.

Once the plane determination module 162 determines the camera plane 310 and the road plane 320, a detection module 164, being part of the location estimation and tracking system 160, determines the tow-bar 214 and coupler 212 locations. The detection module 164 projects the cloud points 402 corresponding to the ROI 300 onto the camera plane 310 as shown in FIG. 5. Then the detection module 164 executes a computer vision-based identification algorithm (e.g., neural networks, correlation filters, etc.) to find the known shapes of the tow-bar 214 or coupler 212 as projected on the camera plane 310. In some examples, the characteristics of the shapes of the tow-bar 214 and the coupler 212 may be stored in memory hardware 154 or may be trained using a training algorithm to identify the shapes. The detection module 164 may then determine the direction of alignment 220 (FIGS. 6A and 6B) of the trailer 200 with respect to the tow vehicle 100 based on the determined position $L_{TC}$ of the coupler 212 and the determined position $L_{TB}$ of the tow-bar 214 and the shape of the trailer hitch 210. Therefore, by projecting the points 402 onto the camera plane 310, the detection module 164 determines the location of the coupler 212 in the camera plane 310 and based on the location of the coupler 212 in the camera plane 310, the detection module 164 determines the location of the coupler 212 in real world 3D coordinates. Additionally, by projecting the points 402 onto the camera plane 310, the detection module 164 determines the alignment direction of the trailer 200 relative to the tow vehicle 100 within the camera plane 310. The detection module 164 determines the location of both, the tow-bar 214 and the coupler 212 which allows to align the vehicle 100 with the trailer 200.

Figure 6A:
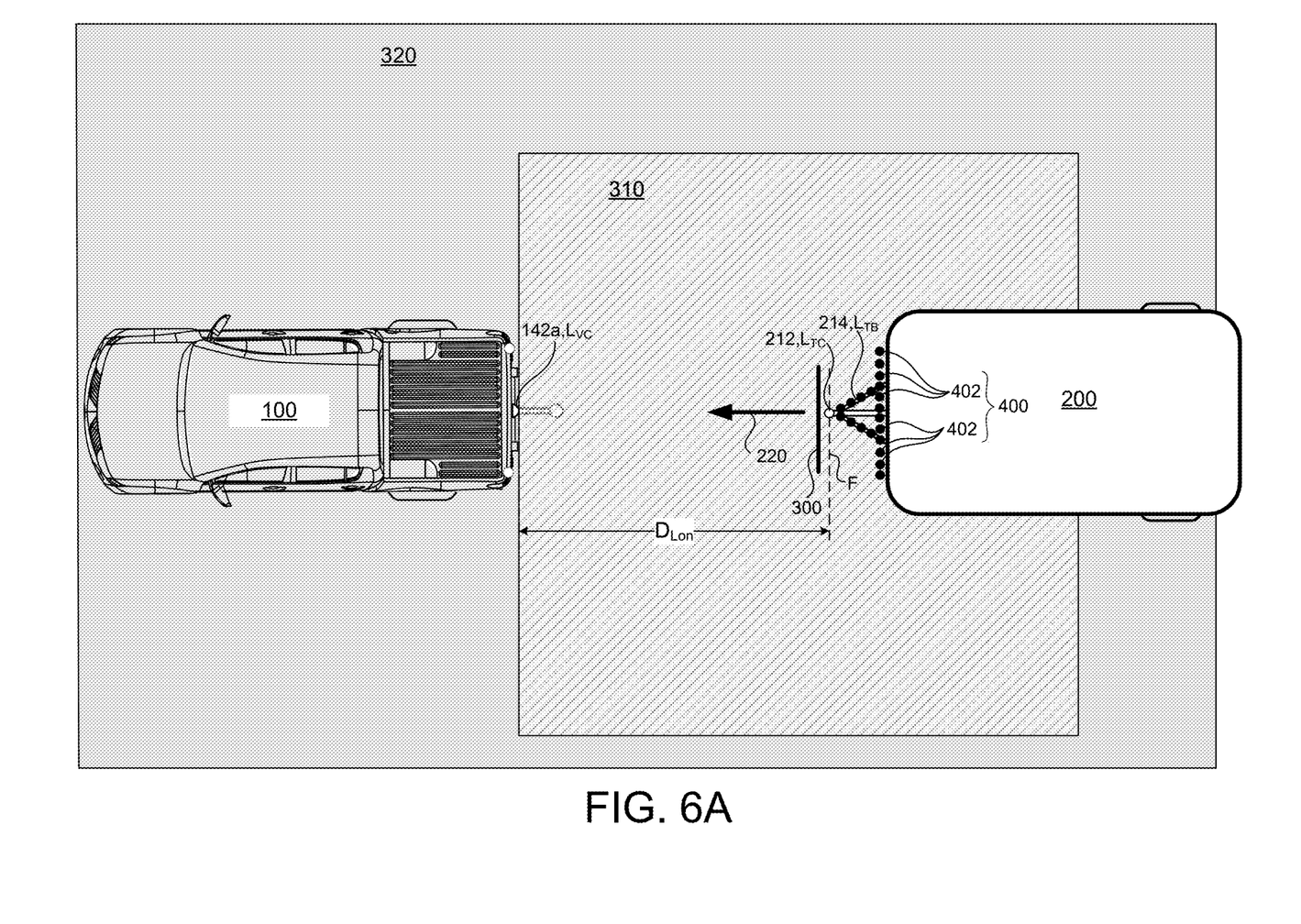
FIGS. 6A and 6B are schematic top views of a projection of a point cloud in a camera plane.
Figure 6B:
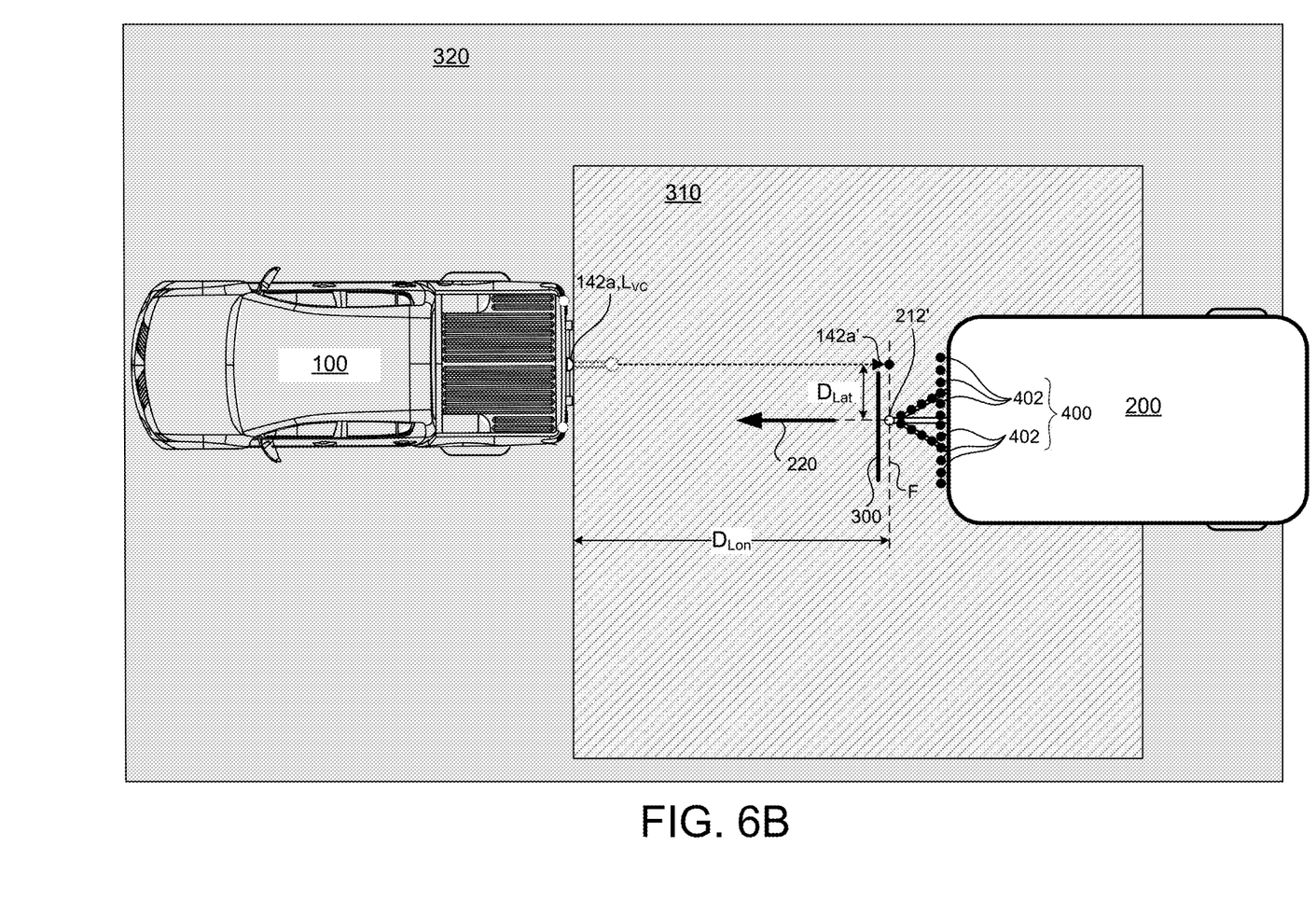

In some implementations, the distance estimation module 166 estimates a distance D between the coupler 212 and the rear camera 142a by determining the distance between the coupler's location $L_{TC}$ in the camera plane 310 and the camera position $L_{VC}$ received from the camera data 141. Referring to FIGS. 6A and 6B, the distance estimation module 166 may determine a plane F formed by the direction of alignment 220 (being a normal of the plan F) and the position of the coupler 212 in the camera plane 310. The longitudinal distance $D_{Lon}$ is the distance between the position of the camera 142a and the plane F. The lateral distance $D_{Lat}$ is the distance between the projection 142a' of the camera position $L_{VC}$ onto F and the projection 212' of the coupler position in the camera plane 310.

In some implementations, the coupler height module 168 determines a height (not shown) of the coupler 212 with respect to the ground. For example, the coupler height module 168 may determine the distance between the coupler location $L_{TC}$, determined by the detection module 164, and the road plane 320. The coupler height module 168 may use the shortest distance between the road plane 320 and the coupler point (if the coupler is represented by more than one point in the point cloud, use the average point to represent the coupler).

The location and estimation tracking system 160 detects the tow-bar 214 and the coupler 212, then determines the coupler location $L_{TC}$ and its height from the ground, and the distance (i.e., longitudinal distance $D_{Lon}$ and lateral distance $D_{Lat}$) between the camera 142a and the coupler location $L_{TC}$. Based on the determined information by the location and estimation tracking system 160, the controller 150 executes a path planning system 170. The path planning system 170 determines a path causing the tow vehicle 100 to autonomously drive in the rearward direction R towards the trailer 200 and autonomously connect with the trailer 200.

As the tow vehicle 100 is autonomously maneuvering along the planned path, the path planning system 170 continuously updates the path based on continuously receiving updated information from the location estimation and tracking system 160. In some examples, an object detection system identifies one or more objects along the planned path and sends the path planning system 170 data relating to the position of the one or more objects. In this case, the path planning system 170 recalculates the planned path to avoid the one or more objects while also executing the predetermined maneuvers. In some examples, the path planning system determines a probability of collision and if the probability of collision exceeds a predetermined threshold, the path planning system 170 adjusts the path and sends it to the driver assist system 180.

Once the path planning system 170 determines the planned path, then the vehicle controller 150 executes a driver assist system 180, which in turn includes path following behaviors 182. The path following behaviors 182 receive the planned path and executes one or more behaviors 182a-b that send commands 190 to the drive system 110, causing the vehicle 100 to autonomously drive along the planned path, which causes the tow vehicle 100 to autonomously connect to the trailer 200.

The path following behaviors 182 include, a braking behavior 182a, a speed behavior 182b, and a steering behavior 182c. In some examples, the path following behaviors 182 also include a hitch connect behavior, and a suspension adjustment behavior. Each behavior 182a-182c causes the tow vehicle 100 to take an action, such as driving backward, turning at a specific angle, breaking, speeding, slowing down, among others. The vehicle controller 150 may maneuver the tow vehicle 100 in any direction across the road surface by controlling the drive system 110, more specifically by issuing commands 190 to the drive system 110.

The braking behavior 182a may be executed to either stop the vehicle 100 or to slow down the vehicle 100 based on the planned path. The braking behavior 182a sends a signal or command 190 to the drive system 110, e.g., the brake system (not shown), to either stop the tow vehicle 100 or reduce the speed of the tow vehicle 100.

The speed behavior 182b may be executed to change the speed of the tow vehicle 100 by either accelerating or decelerating based on the planned path. The speed behavior 182b sends a signal or command 190 to the brake system 114 for decelerating or the acceleration system 116 for accelerating.

The steering behavior 182c may be executed to change the direction of the tow vehicle 100 based on the planned path. As such, the steering behavior 182c sends the acceleration system 116 a signal or command 190 indicative of an angle of steering causing the drive system 110 to change direction.

As previously discussed, the location estimation and tracking system 160 determines the location of the coupler $L_{TC}$ by projecting the cloud point 402 on the camera plane 310. In addition, the location estimation and tracking system 160 filters outliers by the computation of the camera moving plane 310 and the road plane 320. For example, the outliers are points that may have been found on the ground. Only the points that are above the ground and below the camera plane 310 are considered.

In some implementations, the location estimation and tracking system 160 generates a semi-dense or dense point cloud of the captured images 143 instead of only the ROI 300 as previously described. By generating semi-dense or dense point cloud of the captures image 143, the location estimation and tracking system 160 can detect objects within the image 143, therefore, the path planning system 170 may use the identified object to adjust the planned path and avoid the detected objects.

The location estimation and tracking system 160 receives images from a single rear camera 142a, therefore, the location estimation and tracking system 160 does not need prior knowledge of the size of the trailer coupler 212 in the image 143. The location estimation and tracking system 160 uses standard CPU with or without the use of GPUs or graphics accelerators.

Figure 7:
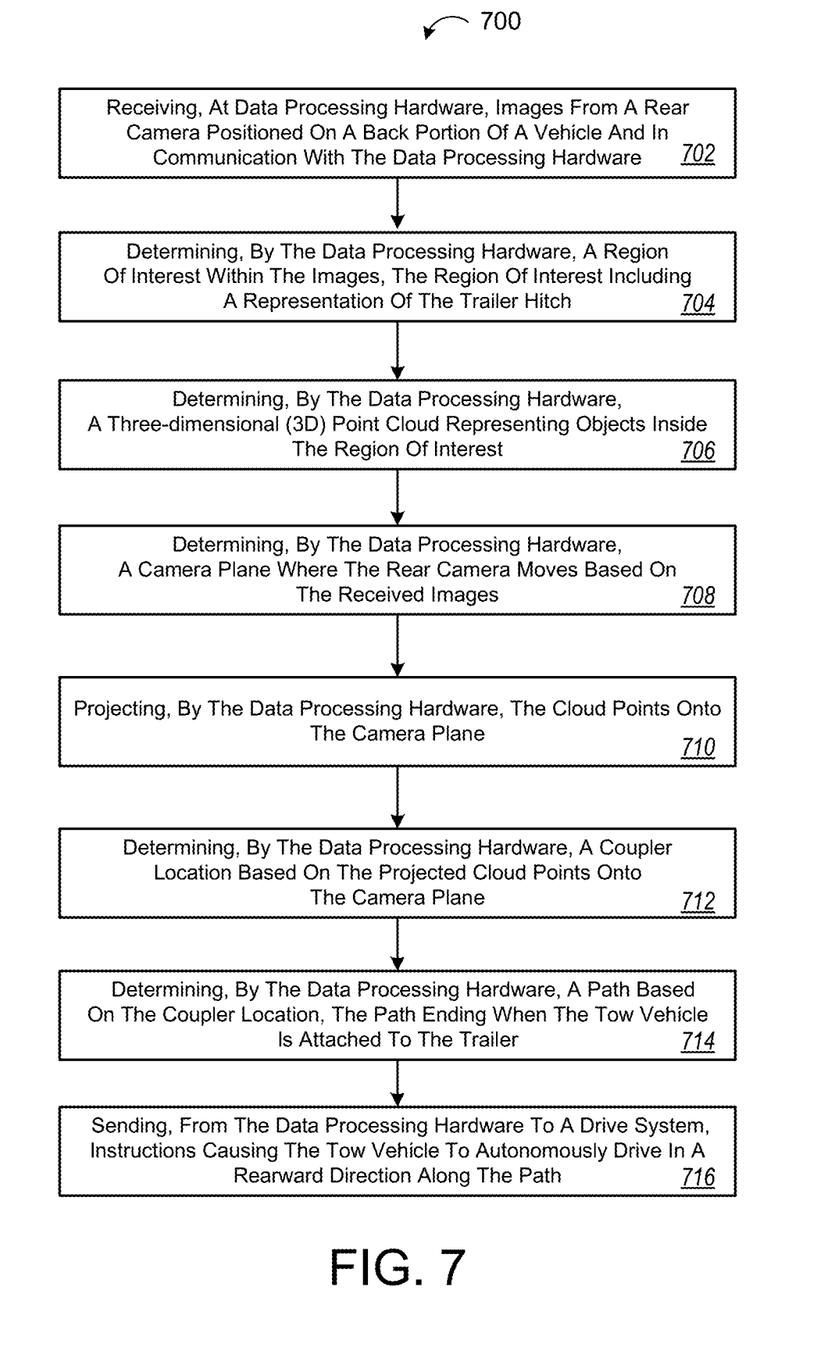
FIG. 7 is a schematic view of an exemplary arrangement of operations for detecting and localizing a coupler of a trailer hitch associated with a trailer behind a tow vehicle.

FIG. 7 provides an example arrangement of operations of a method 700 of detecting and localizing a coupler 212 of a trailer hitch 210 associated with a trailer 200 positioned behind a tow vehicle 100 using the system described in FIGS. 1-6B. At block 702, the method 700 includes receiving, at data processing hardware 152, images 143 from a rear camera 142a positioned on a back portion of a tow vehicle 100 and in communication with the data processing hardware 152. In some examples, the data processing hardware 152 is in communication with memory hardware 154 configures to store instruction, images 143, and/or data. At block 704, the method 700 includes determining, by the data processing hardware 152, a region of interest 300 within the images 143. The region of interest 300 includes a representation of the trailer hitch 210. At block 706, the method 700 includes determining, by the data processing hardware 152, a three-dimensional (3D) point cloud 400 representing objects inside the region of interest 300. At block 708, the method 700 includes determining, by the data processing hardware 152, a camera plane 310 where the rear camera 142a moves based on the received images 143. At block 710, the method 700 includes projecting, by the data processing hardware 152, the cloud points 402 associated with the point cloud 400 onto the camera plane 310. At block 712, the method 700 includes determining, by the data processing hardware 152, a coupler location $L_{TC}$ based on the projected cloud points 402 onto the camera plane 310. At block 714, the method 700 includes determining, by the data processing hardware 152, a path based on the coupler location $L_{TC}$. The path beginning at a current location of the tow vehicle 100 and ending when the tow vehicle 100 is attached to the trailer 200. At block 716, the method 700 includes sending, from the data processing hardware 152 to a drive system 110, instructions 190 causing the tow vehicle 100 to autonomously drive in a rearward direction R along the path.

In some implementations, the method 700 further includes determining, by the data processing hardware 152, an alignment direction 220 of the trailer 200 with respect to the tow vehicle 100 based on the projected cloud points 402 onto the camera plane 310. The path may also be based on the alignment direction 220. In some examples, the method 700 includes determining, by the data processing hardware 152, a longitudinal distance and a lateral distance between the rear camera and the coupler 212. The method includes: determining a plane F normal to the alignment direction 220; determining a first distance $D_{Lon}$ between the rear camera 142a and the plane F. The first distance $D_{Lon}$ indicative of the longitudinal distance $D_{Lon}$. The method 700 may also include: projecting a position of the rear camera 142a on the plane F being a camera projection 142a'; and determining a second distance $D_{Lat}$ between the projection 142a' of rear camera 142a' on the plane F and the projection 212' of the coupler 212 in the camera plane 310. The second distance $D_{Lat}$ indicative of the lateral distance $D_{Lat}$. The path may also be based on the longitudinal distance $D_{Lon}$ and the lateral distance $D_{Lat}$.

In some examples, determining the region of interest 300 within the images 143 (at block 704) includes: sending, from the data processing hardware 152 to a display, instructions to display the received images 143; and receiving, at the data processing hardware 152, a user selection of the region of interest 300.

In some implementations, determining the point cloud 400 of the region of interest 300 (at block 706) includes executing one of a Visual Odometry (VO) algorithm, a Simultaneous Localization and Mapping (SLAM) algorithm, and a Structure from Motion (SfM) algorithm. In some examples, the method 700 also includes initializing the data processing hardware 152 before executing the algorithms by sending, from the data processing hardware 152 to the drive system 110, instructions causing the tow vehicle 100 to drive in a forward F or a rearward R straight direction for a predefined distance.

In some examples, determining the camera plane 310 (at block 708) includes: determining, by the data processing hardware 152, at least three three-dimensional positions of the rear camera from the received images 143; and determining, by the data processing hardware 152, the camera plane 310 based on the three three-dimensional positions. In some implementations, the method 700 also includes determining, by the data processing hardware 152, a road plane 320 by: determining a height of the rear camera 142a from a road supporting the tow vehicle 100; and shifting the camera plane 310 by the height of the rear camera.

In some implementations, the method 700 includes determining a road plane 320 by: extracting, by the data processing hardware 152, at least three feature points from the images 143 including a road; associating, by the data processing hardware 152, a point 402 of the point cloud 400 with each of the feature points; and determining, by the data processing hardware 152, the road plane 320 based on the at least three points of the point cloud 400 associated with the at least three feature points. In some examples, determining the camera plane 310 includes: determining, by the data processing hardware 152, a height of the rear camera 142a from the road; and shifting, by the data processing hardware 152, the road plane 320 by the height of the rear camera 142a.

The method 700 include determining, by the data processing hardware 152, a height of the coupler 212 based on a distance between the coupler 212 and a road plane 320, where the path is based on the height of the coupler 212.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method of detecting and localizing a coupler of a trailer hitch associated with a trailer positioned behind a tow vehicle, the method comprising:

receiving, at data processing hardware, images from a single rear camera positioned on a back portion of a vehicle and in communication with the data processing hardware;

determining, by the data processing hardware, a region of interest within the images, the region of interest including a representation of the trailer hitch;

determining, by the data processing hardware, a three-dimensional (3D) point cloud representing objects inside the region of interest in the images only provided by the single rear camera;

determining, by the data processing hardware, a camera plane where the single rear camera moves based on the received images only provided by the single rear camera without images from another camera;

projecting, by the data processing hardware, cloud points of the 3D point cloud which represent the objects inside the region of interest that are not located in the camera plane, onto the camera plane;

determining, by the data processing hardware, a coupler location based on the projected cloud points onto the camera plane;

determining, by the data processing hardware, a path based on the coupler location, the path ending when the tow vehicle is attached to the trailer; and sending, from the data processing hardware to a drive system of the tow vehicle, instructions for autonomously driving the tow vehicle in a rearward direction along the path.

2. The method of claim 1, further comprising:

determining, by the data processing hardware, an alignment direction of the trailer with respect to the vehicle based on the projected cloud points onto the camera plane;

wherein the path is based on the alignment direction.

3. The method of claim 2, further comprising determining, by the data processing hardware, a longitudinal distance and a lateral distance between the single rear camera and the coupler, by:

determining a plane normal to the alignment direction;

determining a first distance between the single rear camera and the plane, the first distance indicative of the longitudinal distance;

projecting a position of the single rear camera on the plane; and determining a second distance between the projection of the position of the single rear camera on the plane and the projection of the coupler in the camera plane, the second distance indicative of the lateral distance;

wherein the path is based the longitudinal distance and the lateral distance.

4. The method of claim 1, wherein determining the region of interest within the images includes:

sending, from the data processing hardware to a display, instructions to display the received images; and receiving, at the data processing hardware, a user selection of the region of interest.

5. The method of claim 1, wherein determining the point cloud of the region of interest comprises executing one of a Visual Odometry (VO) algorithm, a Simultaneous Localization and Mapping (SLAM) algorithm, and a Structure from Motion (SfM) algorithm.

6. The method of claim 5, further comprising initializing the data processing hardware before executing the algorithms by:

sending, from the data processing hardware to the drive system, instructions causing the tow vehicle to drive in a forward or a rearward straight direction for a predefined distance.

7. The method of claim 1, wherein determining the camera plane comprises:
   determining, by the data processing hardware, at least three three-dimensional positions of the single rear camera from the received images only provided by the single rear camera; and
   determining, by the data processing hardware, the camera plane based on the three three-dimensional positions.

8. The method of claim 7, further comprising:
   determining, by the data processing hardware, a road plane by:
      determining a height of the single rear camera from a road supporting the tow vehicle; and
      shifting the camera plane by the height of the single rear camera.

9. The method of claim 1, further comprising determining a road plane by:
   extracting, by the data processing hardware, at least three feature points from the images including a road;
   associating, by the data processing hardware, a point of the point cloud with each of the feature points; and
   determining, by the data processing hardware, the road plane based on the at least three points of the point cloud associated with the at least three feature points.

10. The method of claim 9, wherein determining the camera plane comprises:
    determining, by the data processing hardware, a height of the single rear camera from the road; and
    shifting, by the data processing hardware, the road plane by the height of the single rear camera.

11. The method of claim 1, further comprising:
    determining, by the data processing hardware, a height of the coupler based on a distance between the coupler and a road plane;
    wherein the path is based on the height of the coupler.

12. A system for detecting and localizing a coupler of a trailer hitch associated with a trailer positioned behind a tow vehicle, the system comprising:
    data processing hardware; and
    memory hardware in communication with the data processing hardware, the memory hardware storing instructions that when executed on the data processing hardware cause the data processing hardware to perform operations comprising:
       receiving images from a single rear camera positioned on a back portion of a vehicle and in communication with the data processing hardware;
       determining a region of interest within the images, the region of interest including a representation of the trailer hitch;
       determining a three-dimensional (3D) point cloud representing objects inside the region of interest in the images only provided by the single rear camera;
       determining a camera plane where the single rear camera moves based on the received images only provided by the single rear camera without images from another camera;
       projecting cloud points of the 3D point cloud which represent the objects inside the region of interest that are not located in the camera plane onto the camera plane;
       determining a coupler location based on the projected cloud points onto the camera plane;
       determining a path based on the coupler location, the path ending when the tow vehicle is attached to the trailer; and
       sending instructions to a drive system of the tow vehicle for autonomously driving the tow vehicle in a rearward direction along the path.

13. The system of claim 12, wherein the operations further include:
    determining an alignment direction of the trailer with respect to the vehicle based on the projected cloud points onto the camera plane;
    wherein the path is based on the alignment direction.

14. The system of claim 13, wherein the operations further include determining a longitudinal distance and a lateral distance between the single rear camera and the coupler, by:
    determining a plane normal to the alignment direction;
    determining a first distance between the single rear camera and the plane, the first distance indicative of the longitudinal distance;
    projecting a position of the single rear camera on the plane; and
    determining a second distance between the projection of the position of the single rear camera on the plane and the projection of the coupler in the camera plane, the second distance indicative of the lateral distance;
    wherein the path is based the longitudinal distance and the lateral distance.

15. The system of claim 12, wherein determining the region of interest within the images includes:
    sending instructions to display the received images; and
    receiving a user selection of the region of interest.

16. The system of claim 12, wherein determining the point cloud of the region of interest comprises executing one of a Visual Odometry (VO) algorithm, a Simultaneous Localization and Mapping (SLAM) algorithm, and a Structure from Motion (SfM) algorithm.

17. The system of claim 12, wherein determining the camera plane comprises:
    determining at least three three-dimensional positions of the single rear camera from the received images; and
    determining the camera plane based on the three three-dimensional positions.

18. The system of claim 17, wherein the operations further comprise: determining a road plane by: determining a height of the single rear camera from a road supporting the tow vehicle; and shifting the camera plane by the height of the single rear camera.

19. The system of claim 12, wherein the operations further comprise:
    determining a road plane by:
       extracting at least three feature points from the images including a road;
       associating a point of the point cloud with each of the feature points; and
       determining the road plane based on the at least three points of the point cloud associated with the at least three feature points.

20. The system of claim 12, wherein the operations further include:
    determining a height of the coupler based on a distance between the coupler and a road plane;
    wherein the path is based on the height of the coupler.

* * * * *